United States Patent [19]

Ishibashi et al.

[11] 4,451,316
[45] May 29, 1984

[54] PROCESS FOR PREPARATION OF METAL VESSELS

[75] Inventors: Kazuhisa Ishibashi, Tokyo; Hideo Kurashima, Yokosuka; Hisakazu Yasumuro; Michio Watanabe, both of Yokohama; Tsuneo Imatani, Yokosuka; Kazuo Taira, Tokyo; Seishichi Kobayashi, Yokohama; Hiroshi Ueno, Yokosuka, all of Japan

[73] Assignee: Toyo Seikan Kaisha, Ltd., Tokyo, Japan

[21] Appl. No.: 435,887

[22] Filed: Oct. 21, 1982

[30] Foreign Application Priority Data

Oct. 26, 1981 [JP] Japan ............................ 56-170201
Jun. 22, 1982 [JP] Japan ............................ 57-106220

[51] Int. Cl.³ .............................................. B29C 19/04
[52] U.S. Cl. ............................ 156/274.6; 156/274.8; 156/275.3; 156/294; 413/1
[58] Field of Search .................. 156/294, 295, 274.6, 156/274.8, 274.4, 275.3, 275.5, 272.4; 413/1

[56] References Cited

U.S. PATENT DOCUMENTS 3,281,302 10/1966 Kreb et al. ................ 156/274.6
3,620,886 11/1971 Sims ........................... 156/272.4
3,802,942 4/1974 Aniberg ...................... 156/294
3,996,092 12/1976 Leatherman ............... 156/272.4
4,226,652 10/1980 Bery ............................ 156/296
4,280,268 7/1981 Gorden ....................... 156/294
4,373,983 2/1983 Walter ........................ 156/294

Primary Examiner—Leon Gilden
Attorney, Agent, or Firm—Sherman & Shalloway

[57] ABSTRACT

Disclosed is a process for the preparation of metal vessels, which comprises lap-bonding both the circumferential end portions of upper and lower members, each consisting of a seamless formed metal cup, through a layer of a hot adhesive interposed therebetween, wherein a high frequency induction heating coil is arranged so that the coil covers a part, smaller than the semicircle, of the circumferential portion to be formed into a seam, which circumferential portion consists of said end portions engaged with each other through the hot adhesive layer, electricity is applied to the heating coil to induce an eddy current passing through said end portions and the circumferential portion and the heating coil are rotated relatively to each other, whereby both the end portions are heated and a seam is formed by heat bonding.

5 Claims, 10 Drawing Figures

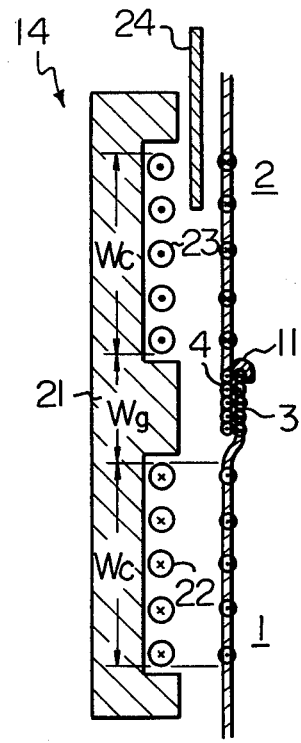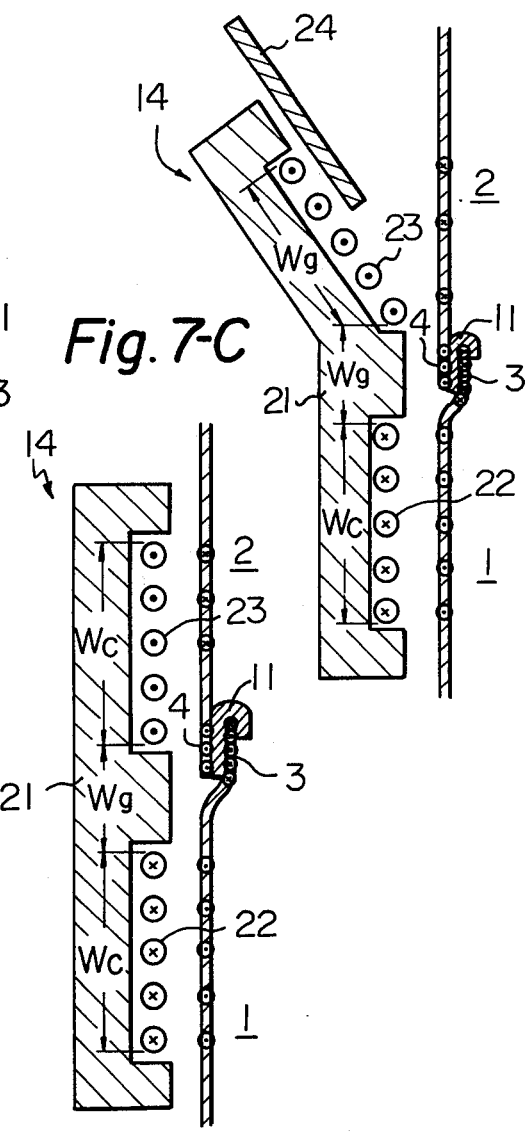

PROCESS FOR PREPARATION OF METAL VESSELS

BACKGROUND OF THE INVENTION (1) Field of the Invention

The present invention relates to a process for the preparation of metal vessels having a seam formed by heat bonding. More particularly, the present invention relates to a process for the preparation of metal vessels, in which both the end portions of vessel blanks engaged with each other through an adhesive resin layer are effectively heated by a high frequency induction heating coil to form a seam by heat bonding.

(2) Description of the Prior Art

High frequency induction heating a heating means widely adpoted for heating metal blanks and also for production of metal vessels having a seam formed by heat bonding, such as bonded cans. However, since a high frequency magnetic field from a high frequency induction heating coil is intercepted by metal blanks, according to the conventional technique, there have been adopted a method in which an adhesive resin applied to the end portion of a vessel blank is heated by high frequency induction heating prior to lapping, both the end portions are lapped together through a molten adhesive layer and the lapped end portions are subjected to bumping under cooling to form a seam and a method in which the outer side of both the end portions of vessel blanks engaged with each other through an adhesive resin layer is heated by high frequency induction heating and heat bonding of both the end portions it accomplished by heat applied from the outer side.

The former method is advantageously applied to the case where heat bonding is effected by pressing both the end portions in the lapping direction as in the case of production of a lap-side-seam can having a seam extended straightly in the axial direction, but this method is hardly applicable to the case where circumferential end portions of upper and lower members, each consisting of a cup formed by drawing or draw-ironing, are fitted together through an adhesive to form a vessel, because the molten adhesive layer is protruded outward from the seam by the pressing force applied in the axial direction at the fitting step or the open end portions are damaged by this pressing force.

The latter method is defective in that the end portion to be located on the inner side of the seam is heated only by the conducted heat because a high frequency magnetic field is intercepted on the end portion on the outer side and that since the heat conductivity of the adhesive layer interposed between both the end portions is lower than that of the metal, an extremely long time is necessary for accomplishing heat bonding and in the portions to be bonded, there is inevitably formed such a temperature gradient that the temperature of the end portion on the outer side is high and the temperature of the end portion on the inner side is low, with the result that uniform heating becomes difficult. Especially in the case where the metal blank is composed of a ferromagnetic material such as steel, the end portion to be located on the inner side is hardly heated.

SUMMARY OF THE INVENTION

It is therefore a primary object of the present invention to provide a process in which in preparing a metal vessel having a circumferential lap seam, both the end portions of upper and lower members engaged with each other through an adhesive resin layer are simultaneously and effectively heated from either the end portion on the outer side or the end portion on the inner side by high frequency induction heating.

Another object of the present invention is to provide a process in which a hot adhesive interposed between both the engaged end portions for forming a circumferential seam is heated effectively and uniformly in a short time by high frequency induction heating.

Still another object of the present invention is to provide a process in which both the end portions of upper and lower members, between which an adhesive layer is interposed, are heated at optional temperatures, respectively.

More specifically, in accordance with the present invention, there is provided a process for the preparation of metal vessels, which comprises lap-bonding both the circumferential end portions of upper and lower members, each consisting of a seamless formed metal cup, through a layer of a hot adhesive interposed therebetween, wherein a high frequency induction heating coil is arranged so that the coil covers a part, smaller than the semicircle, of the circumferential portion to be formed into a seam, which circumferential portion consists of said end portions engaged with each other through the hot adhesive layer, electricity is applied to the heating coil to induce an eddy current passing through said end portions and the circumferential portion and the heating coil are rotated relatively to each other, whereby both the end portions are heated and a seam is formed by heat bonding.

BRIEF DESCRIPTION OF THE DRAWINGS

FIGS. 7-A, 7-B and 7-C are enlarged sectional partial side views showing several examples in which the temperature distribution of the portion to be formed into a seam is changed by changing the arrangement of the high frequency induction heating coil.

DETAILED DESCRIPTION OF THE PREFERRED EMBODIMENTS

The present invention will now be described in detail with reference to the embodiments illustrated in the accompanying drawings.

Figure 1:
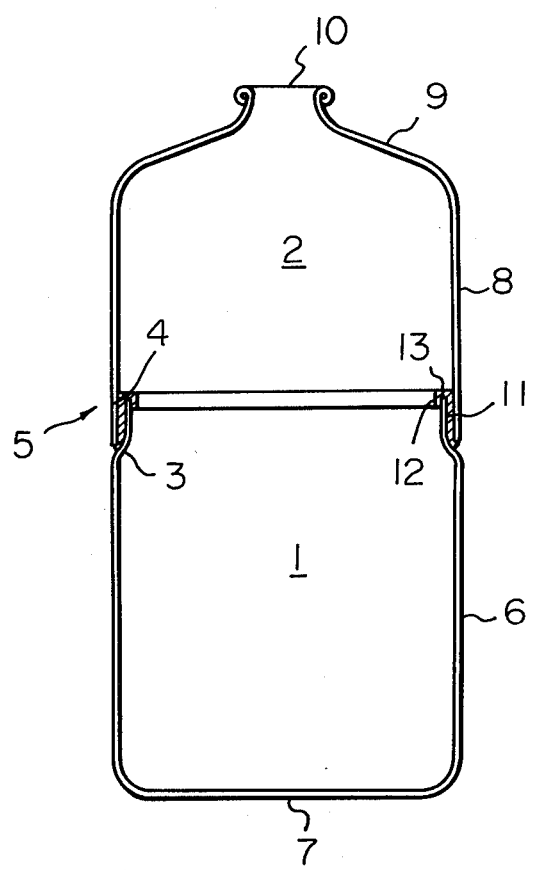
FIG. 1 is a sectional side view showing one embodiment of a bottle-shaped metal vessel according to the present invention.

Referring to FIG. 1 illustrating an example of the bottle-shaped metal vessel prepared according to the present invention, this bottle comprises a lower member 1 consisting of a seamless formed cup composed of a metal such as a tin-plated steel plate and an upper member 2 consisting of a seamless formed cup of a metal. These formed cups are bonded together in the state where the open end portions 3 and 4 are lapped together to form a circumferential side seam 5, whereby an integrated vessel is formed.

In this example, the lower member 1 is a cup comprising a tall thin side wall portion 6 formed by high-degree draw-ironing of a metal blank and a thick bottom portion 7 which has not substantially been ironed, while the upper member 2 is a cup comprising a tall thin side wall portion 8 and a top wall 9, which is formed according to a method similar to the method adopted for formation of the lower member 1. The height of the side wall 8 of the upper member 2 is equal to or larger than the width of the seam 5. The top wall 9 of the upper member 2 has an upwardly protruded tapered surface, and a pouring mouth 10 for packing or withdrawing the content is formed at the center of the top wall 9.

In the embodiment illustrated shown in FIG. 1, the diameter of the open end portion 3 of the lower member 1 is reduced below the diameter of the other barrel wall portion by necking of the portion adjoining to the open end portion 3, and this diameter-reduced open end portion 3 is fitted and inserted into the larger-diameter open end portion 4 of the upper member 2. A heat-bondable adhesive layer 11 is interposed between the outer surface of the open end portion 3 of the lower member 1 and the inner surface of the open end portion 4 of the upper member 2, and the lower and upper members are bonded together by this adhesive layer 11. From the viewpoint of the corrosion resistance, it is preferred that a part of the adhesive 11 be protruded from the seam 5 to form a covering layer 12 for a cut edge 13 of the metallic material located on the inner side of the seam 5.

In the metal vessel having the above-mentioned structure, since only a very small pouring mouth 10 is formed on the upper member 2, after fitting of the upper and lower members 2 and 1, it is practically impossible to insert a heating mechanism or the like into the assembly formed by fitting, and therefore, it will readily be understood that heating of the fitted portions is possible only by external heating.

According to the present invention, an electric current is applied to a high frequency induction heating coil which is located and arranged on the outer side of the fitted portions in a special manner and the fitted portion and the coil are rotated relatively to each other, whereby not only the open end portion 4 located on the outer side but also the open end portion 3 located on the inner side can be heated at a high efficiency and bonding can be accomplished in a very short time.

Figure 2:
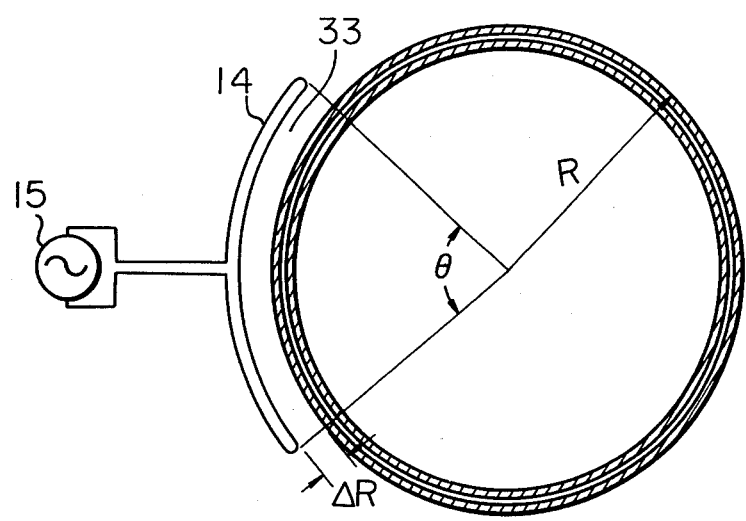
FIG. 2 is a sectional side view of a high frequency induction heating coil and a vessel, which illustrates the principle of the present invention.
Figure 3:
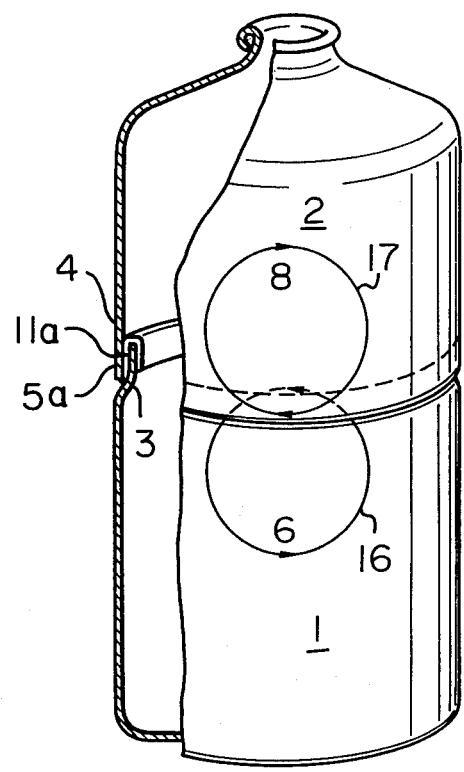
FIG. 3 and FIG. 4 are diagrams illustrating the state of an eddy current induced by a high frequency induction heating coil.

Referring to FIGS. 2 and 3 illustrating the principle of the present invention, in the circumferential portion 5a to be formed into a seam, both the end portions 3 and 4 of the lower and upper members 1 and 2 are mechanically engaged with each other through an adhesive layer 11a by fitting, as is seen from the sectional partial view of FIG. 3.

According to the present invention, as is seen from FIG. 2, a high frequency induction heating coil 14 is arranged so that the coil 14 covers a part 33 smaller than the semicircle of the circumferential portion 5a, and electricity is applied to the coil 14 from a power source 15.

One of important features of the present invention is that as is seen from FIG. 3, by this application of electricity to the high frequency induction heating coil 14, an eddy current 16 is induced in the lower member 1 so that it runs from the non-lapped side wall portion 6 to the lapped end portion 3, and also in the upper member 2, there is induced an eddy current 17 flowing from the non-lapped side wall portion 8 to the lapped end portion 4. Since the side wall portions 6 and 8 have a broad area, the densities of the eddy currents are relatively low in the side wall portions 6 and 8. On the other hand, since the end portions 3 and 4 are formed as cut edges and their areas are not broad and because of an effect of concentration of the electric current on the edges, the densities of the eddy currents are relatively high in the end portions 3 and 4. Accordingly, not only the open end portion 4 located on the outer side of the lap but also the open end portion 3 located on the inner side of the lap is intensely heated.

In accordance with the present invention, the high frequency induction heating coil 14 is arranged so that electromagnetic coupling is caused with the non-lapped side wall portions 6 and 8 of the lower and upper members, and an eddy current flowing from the side wall portion to the lapped end portion is induced in each of the upper and lower members, whereby it is made possible to heat intensely and selectively both the end portions 3 and 4 bonded together through the hot adhesive layer 11a.

In the present invention, it is important that the high frequency induction heating coil 14 is arranged so that a part 33 of the circumferential portion 5a to be heat-bonded, which is smaller than the semicircle of the portion 5a, is covered by the coil 14 and that induction heating is carried out while moving the coil 14 relatively to the circumferential portion 5a. In the case where the high frequency induction heating coil 14 entirely covers the circumferential portion 5a or covers a part of the circumferential portion 5a, which is larger than the semicircle thereof, a turning current turning around the entire periphery of the side wall of the upper member 2 or lower member 1 is induced, and the proportion of the eddy current flowing from the side wall portion to the end portion is reduced, with the result that it becomes difficult to attain the object of the present invention, that is, the object of selectively heating the end portions alone in a short time.

Furthermore, in the present invention, since the eddy currents 16 and 17 are induced in relatively small regions, by rotating the heating coil 14 relatively to the circumferential portion 5a to be heat-bonded, the entire periphery of the circumferential portion 5a can be heated uniformly in a short time.

According to the heating method of the present invention, since the induced current is concentrated on the circumferential portion 5a, the length of the circumferential portion heated especially intensely is shorter than the length of the part covered by the heating coil, and the temperature distribution is such that the temperature is highest at the center of the heating coil and the temperature is lowered at a point separate from the center of the heating coil. Accordingly, if the number of the relative rotation of the circumferential portion to the heating coil during the period of from the point of the starting of heating to the point of the termination of heating is small, elevation of the temperature becomes uneven in the circumferential direction. Therefore, it is important that the rotation number should be increased beyond a certain level.

In the present invention, the directions of the two eddy currents 16 and 17 are not critical but optional. For example, there may be adopted a method in which one current 16 is caused to flow in the counterclockwise direction and the other current 17 is caused to flow in the reverse direction, that is, the clockwise direction, as shown in FIG. 3, whereby the directions of the currents are made substantially parallel to each other in the lapped end portions 3 and 4. When this method is adopted, even if a short electric circuit is formed between the end portions 3 and 4, eddy currents can be formed smoothly.

Figure 4:
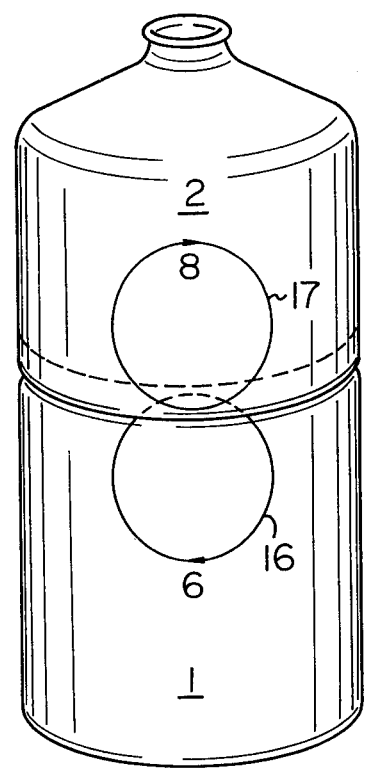

Furthermore, both the currents 16 and 17 may be eddy currents turning in the same direction, that is, in the clockwise or counterclockwise direction, as shown in FIG. 4.

Any of high frequency induction heating coils capable of inducing the above-mentioned eddy currents 16 and 17 in the lower and upper members can be used as the high frequency induction heating coil 14 in the present invention. An appropriate example of the high frequency induction heating coil will now be described, though coils that can be used in the present invention are not limited to the example described below.

Figure 5:
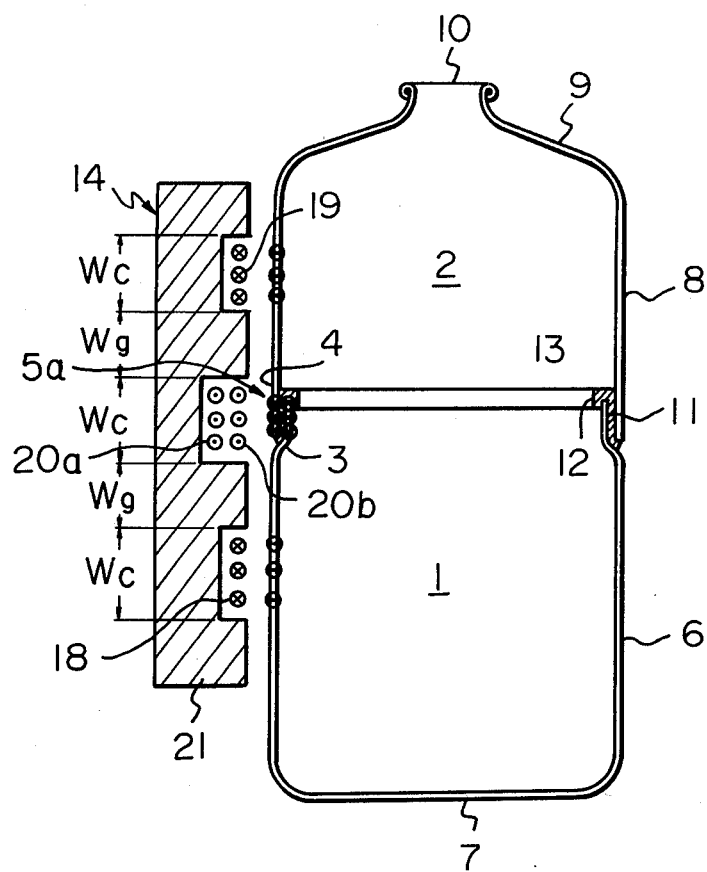
FIG. 5 and FIG. 6 are sectional side views of a high frequency induction heating coil and a vessel, which illustrate the principle of the present invention.

For example, a structure shown in FIG. 5 may be used for generating eddy currents of the type shown in FIG. 3.

On the outer side of the portion 5a to be formed into a seam, a high frequency induction heating coil generally indicated by reference numeral 14 is arranged so that the following positional relationship is established. The side wall 6 connected to the inner open end portion 3 confronts a coil portion 18 where an electric current flows downward in the vertical direction in the drawings at a certain point of time, while the side wall 8 connected to the open end portion 4 confronts a coil portion 19 where an electric current flows upward in the vertical direction in the drawings at the same point of time, and the portion 5a to be formed into a seam confronts coil portions 20a and 20b where an electric current flows upward in the vertical direction in the drawings at the same point of time. Although only the sections of these coil portions are shown in the drawings, it will readily be understood that both the coil portions 18 and 19 are continuous to the coil portions 20a and 20b substantially in the vertical direction in the drawings to form two loops. Incidentally, referential numeral 21 in the drawings represents a magnetic core composed of a magnetic material such as ferrite, which is used for intensifying the electromagnetic coupling between the side walls 6 and 8 and the coil portions 18 and 19 or between the coil portions 20a and 20b and the circumferential portion 5a to increase the heating efficiency.

If the above-mentioned arrangement is adopted, eddy currents 16 and 17 shown in FIG. 3 are induced in the lower and upper members 1 and 2 in correspondence to the coil portions 18 and 19, respectively.

Figure 6:
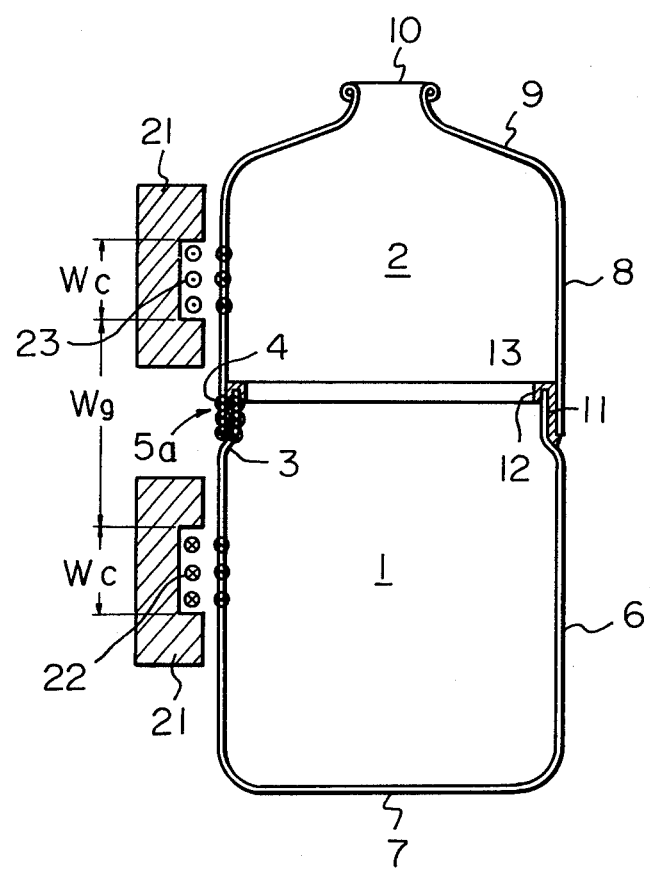

A coil shown in FIG. 6 may be used as the coil for generating eddy currents of the type shown in FIG. 4. The side wall 6 connected to the inner open end portion 3 confronts the coil portion 22 where an electric current flows downward in the vertical direction in the drawings at a certain point of time and the side wall 8 connected to the outer open end portion 4 confronts the coil portion 23 where an electric current flows upward in the vertical direction at the same point of time, and the portion 5a to be formed into a seam is located substantially at the central point between the coil portions 22 and 23. Although only the sections of the coil portions 22 and 23 are shown in the drawings, it will readily be understood that both the coil portions form a loop continuous substantially in the vertical direction in the drawings.

If this arrangement is adopted, an eddy current 16 is induced in the lower member 1 in correspondence to the coil portion 22 and an eddy current 17 is induced in the upper member 2 in correspondence to the coil portion 23, as shown in FIG. 4. If the coil shown in FIG. 6 is used, the effect of concentrating the electric current by the cut edges is especially enhanced in the end portions to be bonded, and therefore, the end portions 3 and 4 can be heated more efficiently and selectively.

As will be apparent from the foregoing description, according to the present invention, electromagnetic coupling between the high frequency induction heating coil and the metal blanks to be heated is effected in both the side wall portions 6 and 8 separate from the lap of both the end portions of the metal blanks, rather than in this lap portion, whereby both the end portions 3 and 4 of the blanks can be heated at a high efficiency. Furthermore, since both the inner and outer end portions 3 and 4 are heated in the state where the adhesive layer is interposed therebetween, uniform heating can be accomplished in a short time. If the heating time is short, the amount of the molten adhesive flowing over the portion to be formed into a seam is advantageously reduced.

In the present invention, the length of the region of electromagnetic coupling of the side wall portions 6 and 8 with the coil, that is, the length of the coil 14 covering the circumferential portion 5a to be bonded, is shorter than the semicircle of the circumferential portion, as pointed out hereinbefore. In the present invention, it is preferred that while the clearance $\Delta R$ of the coil 14 and the circumferential portion 5a is within R/4 in which R stands for the outer diameter of the circumferential portion 5a, the vertical angle $\theta$ from the center of the circumferential portion 5a be in the range of from 30° to 150°, especially from 40° to 100°.

In the present invention, it is preferred that induction heating be carried out in the state where the fitted assembly of the upper and lower members is rotated while the high frequency induction heating coil 14 is fixed. Namely, induction heating is carried out by rotating the circumferential portion 5a 5 to 25 times, especially 10 to 15 times, during the period of from the point of the starting of heating to the point of the termination of heating. Various modes may be adopted for the arrangement of the coil so far as the above-mentioned requirements are satisfied. For example, there may be adopted a method in which the heating coil is linearly arranged and induction heating is carried out while rotating a plurality of fitted assemblies aligned along the heating coil, and a method in which fitted assemblies are rotatably supported on respective pockets of a turret, a coil is arranged for each pocket of the turret so that it covers a part of the periphery of the assembly in said pocket and the peripheral portion of each fitted member is heated by induction heating. The former method is advantageous in that the apparatus arrangement is simple and easy, but the heating efficiency is low. On the other hand, according to the latter method, the heating efficiency can be increased to a high level.

All of high frequency currents customarily adopted for induction heating of this type can be used as the high frequency current to be applied to the coil, and ordinarily, for example, a high frequency current of 10 to 500 KHz is preferably used. According to the method in which the lapped end portions are directly heated by induction heating, it is difficult to force high frequency waves to pass through the lapped end portions unless the frequency is lower than 20 KHz, and if the frequency is at such a low level, the heating efficiency is inevitably reduced and in both the end portions, there is inevitably brought about a temperature gradient where the outer side is at a higher temperature and the inner side is at a lower temperature. In contrast, according to the present invention, high frequency waves of an optional frequency can be used and it is not necessary to consider whether or not the high frequency waves pass through the lapped end portions, and the heating efficiency can be increased without any temperature gradient.

The input to the heating coil differs greatly according to the size of the vessel, the required heating temperature and the heating time and the input cannot be specified sweepingly, but for example, when a vessel having a circumferential seam having a diameter of 110.6 mm is prepared by using a polyester type adhesive, the heat bonding treatment is completed for such a short time as 0.3 second at an input of 7 KW.

According to the present invention, the end portion to be located on the outer side and the end portion to be located on the inner side may be heated at the same temperature or at different temperatures.

In an embodiment illustrated in FIG. 7-A, if the thickness to of the outer member 2 is equal to the thickness ti of the inner member 1 and the distance between the coil portion 22 and the side wall 6 is equal to the distance between the coil portion 23 and the side wall 8, the temperature of the outer end portion 4 often becomes slightly higher than the temperature of the inner end portion 3. In this case, if a ferrite core or copper plate 24 is inserted between the portion 23 of the heating coil 14 and the outer member 2, the temperature To of the outer end portion 4 is made equal to the temperature Ti of the inner end portion 3. When the ferrite core is used, the loss of electric power is smaller than in the case of the copper plate, and the heating efficiency is increased. Furthermore, if the distance between the outer member 2 and the coil portion 23 is made larger than the distance between the inner member 1 and the coil portion 22, heating can be carried out so that the relation of To=Ti is established.

In an embodiment shown in FIG. 7-B, the distance between the outer member 2 and the coil portion 23 is made larger than the distance between the inner member 1 and the coil portion 22 and the ferrite core or copper plate 24 is inserted between the outer member 2 and the coil portion 23, whereby heating can be carried out so that the temperature relation of Ti>To is established. Of course, if the above positional relationship is reversed, it is possible to carry out heating so that the temperature relation of To>Ti is established.

In an embodiment shown in FIG. 7-C, the position of the heating coil 14 is lowered relatively to the position of the fitted portion 5a, whereby the eddy current induced in the outer end portion 4 is reduced to control elevation of the temperature of the outer end portion 4 so that the relation of Ti>To is established. In contrast, if the position of the coil 14 is elevated relatively to the position of the fitted portion 5a in the embodiment shown in FIG. 7-C, the eddy current induced in the inner end portion 3 is reduced to control elevation of the temperature of the inner end portion 3.

In the present invention, any of adhesives which are melted, softened or activated by heat to show an adhesiveness can be used. For example, there may advantageously be used thermoplastic resin type adhesives such as polyester type adhesives, polyamide type adhesives and acid-modified polyolefin type adhesives. Of course, adhesives that can be used in the present invention are not limited to those exemplified above.

As the vessel blank, there may be used all of metal-containing blanks, for example, plates of light metals such as aluminum, tinplate, tin-free steel plate, other surface-treated steel plates and black plate. These blanks may be coated with various paints. Furthermore, a laminate of a metal foil and a plastic film can be used as the vessel blank. When this plastic film has a heat sealability, the film can be used as the adhesive layer.

The present invention will now be described in detail with reference to the following specific embodiment.

A modified vinyl paint is coated on the inner and outer surfaces of an aluminum plate (3004 plate, H19) having a thickness of 0.23 mm so that the amounts coated are 180 mg/dm$^2$ and 80 mg/dm$^2$, respectively, and the coated paint is baked. The coated aluminum plate is punched into a disc having a diameter of 250 mm, and the disc is then subjected to a customary pressing operation to obtain an upper member in which the inner diameter of the edge portion to be bonded is 110.60 mm and a pouring mouth having a diameter of 30 mm is formed at the central portion.

Separately, a disc having a diameter of 250 mm is formed from the above coated aluminum plate and the disc is subjected to a pressing operation to obtain a lower member in which the outer diameter of the edge portion to be bonded is 110.5 mm.

An adhesive is applied to the entire circumference of the edge portion of the lower member along a width of about 6 mm on the outer surface side and a width of about 2 mm on the inner surface side in the following manner. More specifically, in Examples 1 and 2, the lower member is masked so that the edge portion is exposed along a width of 6 mm on the outer surface side and a width of 2 mm on the inner surface side, and a powder of nylon 12 is electrostatically coated to the exposed portion and the edge portion is heated by an infrared ray heater to melt the powder and form an adhesive film having a thickness of about 85μm.

The above-mentioned upper member is fitted to the adhesive-applied lower member, and the fitted assembly is passed through heating and cooling zones arranged in one station, whereby the adhesive on the fitted portion is melted, cooled and solidified to obtain a metal vessel having a capacity of about 2000 ml, which consists of the bonded upper and lower members.

The heating coils, heating steps and cooling steps adopted in Examples will now be described.

In Example 1 and subsequent Examples 2 and 3, in the heating zone, the fitted assembly is heated at an input of 7 KW for 0.3 second while the fitted assembly is rotated at 480 rpm, and in the cooling zone, compressed air is jetted to the fitted portion for 1 second by using a compressed air jet nozzle just after completion of heating.

As shown in FIGS. 7-A, 7-B and 7-C, the shape of the heating coil used at the heating step is such that the diameter of the coil portions 22 and 23 is 4 mm, the turn number of the flat spiral heating coil is 5, the width Wc of the wound portion of the coil is 25 mm and the width Wg of the empty portion is 20 mm.

The nozzle for cooling the outer member is arranged so that is surrounds the fitted portion of the vessel on the side opposite to the side confronting the heating coil, and the nozzle for cooling the inner member is inserted from the opening of the outer member and set to cool the position corresponding to the outer nozzle.

EXAMPLE 1

The heating coil is set in such a manner that the center of the heating coil is lowered by 2 mm ($\Delta l = -2$ mm) from the center of the fitted portion, so that elevation of the temperature of the outer member is equal to elevation of the temperature of the inner member. In the cooling step, air is blown to the outer and inner members.

Figure 8:
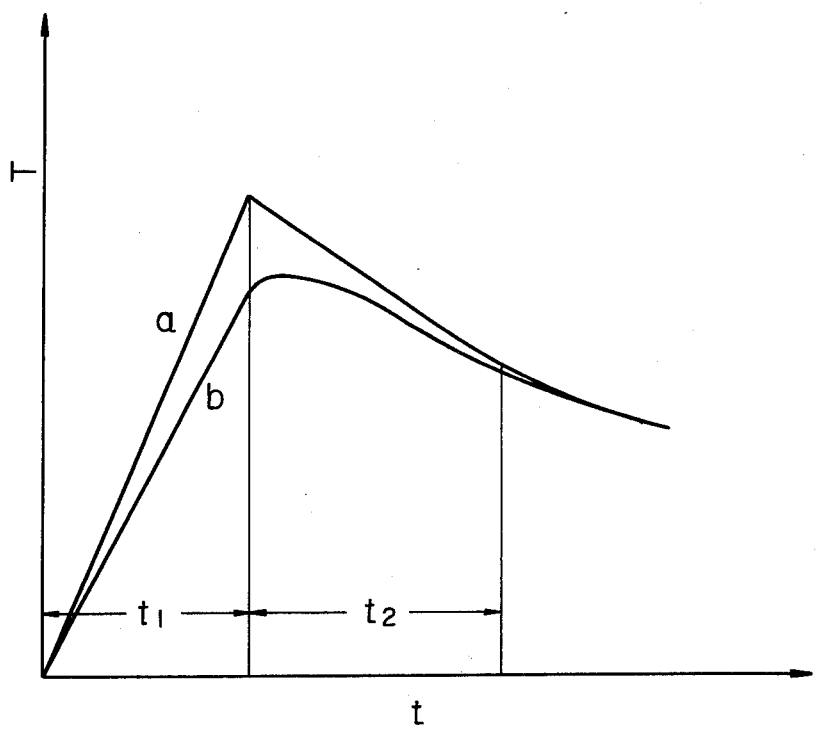
FIG. 8 is a temperature-time curve obtained at the steps of heating and cooling the respective portions of the seam in Example 1.

The temperature of the fitted portion is as shown in FIG. 8. In FIG. 8, curve a indicates the temperature of the fitted portions of the outer and inner members and curve b indicates the temperature of the adhesive.

At the time t1 of completion of heating, the temperature of each of the fitted portions of the outer and inner members is 230° C. and the temperature of the adhesive is 195° C.

The time t2 required for the temperature of the adhesive to fall to the solidification point of 145° C. is 0.5 second from the point of completion of heating.

At the point of time when the adhesive is solidified, the temperatures of the outer and inner members are equally 115° C. Accordingly, no pressing force exceeding the necessary pressing force is imposed on the adhesive and the adhesive is not protruded from the fitted portion, and even after the temperature of the fitted portion is lowered to normal temperature, no tensile stress is applied to the adhesive.

EXAMPLE 2

The heating coil is set in such a manner that the center of the heating coil is raised by 1 mm ($\Delta l = +1$ mm) from the center of the fitted portion, so that the temperature of the fitted portion of the outer member is higher than the temperature of the fitted portion of the inner member.

At the time t1 of completion of heating, the temperature of the outer member is 245° C. and the temperature of the inner member is 215° C., and the temperature of the adhesive is 195° C.

The time required for the temperature of the adhesive to fall to the solidification point of 145° C. is 0.5 second from the point of time of completion of heating. At this point t2, the temperature of the inner member is 110° C. and the temperature of the outer member is 120° C. Since the temperature of the outer member is slightly higher, the clamping force to the adhesive is weakened to some extent, but a slight temperature difference such as mentioned above does not cause any practical trouble.

EXAMPLE 3

The heating coil is set in such a manner that the center of the heating coil is lowered by 3 mm ($\Delta l = -3$ mm) from the center of the fitted portion, so that the temperature of the fitted portion of the outer member is lower than the temperature of the fitted portion of the inner member.

At the time t1 of completion of heating, the temperature of the outer member is 220° C. and the temperature of the inner member is 240° C., and the temperature of the adhesive is 195° C.

The time required for solidification of the adhesive is 0.5 second from the time of completion of heating. At this point t2, the temperature of the outer member 115° C. and the temperature of the inner member is 120° C. Since the temperature of the outer member is slightly lower than the temperature of the inner member, a clamping force acts on the adhesive and there is a risk of protrusion of the adhesive in the molten state. However, no practical trouble is caused.

EXAMPLE 4

The shape of the heating coil adopted in this Example is shown in FIG. 5. The diameter of the conductor of the heating coil portions 18, 19, 20a and 20b is 4 mm. The turn number of the heating coil electromagnetically coupled with the upper member 2 and lower member 1 is 2, and the turn number of the heating coil electromagnetically coupled with the fitted portion 5a is 4. The vertical angle $\theta$ of the heating coil covering the assembly to be heated is 90°, and the width Wc of the wound portion is 10 mm and the width Wg of the empty portion is 20 mm.

At the heating step, the heating coil is set so that elevation of the temperature in the outer member is equal to elevation of the temperature in the inner member, and the fitted assembly is heated for 0.5 second with an input of 5 KW by a 300 KHz high frequency induction heating device while rotating the fitted assembly 10 times during the heating period. Simultaneously with termination of heating, compressed air is blown to the fitted portion for 1 second by using a compressed air nozzle to effect cooling.

At the time of termination of heating, each of the temperatures of the fitted portions of the outer end inner members is 230° C.

At the point of time when the adhesive is solidified, both the temperatures of the outer and inner members are equally 115° C. Accordingly, no pressing force exceeding the necessary pressing force is imposed on the adhesive and the adhesive is not protruded from the fitted portion, and even after the temperature of the fitted portion is lowered to normal temperature, no tensile stress is applied to the adhesive.

EXAMPLE 5

The heating coil adopted in this Example has a shape shown in FIG. 6. The diameter of the conductor of the heating coil portions 22 and 23 is 4 mm, and the turn number of the flat spiral heating coil electromagnetically coupled with the upper member 2 and lower member 1 is 4. The width Wc of the wound portion is 20 mm and the width Wg of the empty portion is 25 mm. The vertical angle $\theta$ of the heating coil covering the fitted assembly to be heated is 90°.

At the heating step, the heating coil is set in such a manner that the center of the heating coil is lowered by 2 mm from the center of the fitted portion, so that elevation of the temperature in the outer member is equal to elevation of the temperature in the inner member. The fitted assembly is heated for 0.5 second with an input of 4 KW by a 300 KHz high frequency induction heating device while rotating the fitted assembly 10 times during the heating period. Simultaneously with termination of heating, compressed air is blown to the fitted portion for 1 second by using a compressed air nozzle to effect cooling.

At the time of termination of heating, each of the temperatures of the fitted portions of the outer and inner members is 230° C.

At the point of time when the adhesive is solidified, both the temperatures of the outer and inner members are equally 115° C. Accordingly, no pressing force exceeding the necessary pressing force is imposed on the adhesive and the adhesive is not protruded from the fitted portion, and even after the temperature of the fitted portion is lowered to normal temperature, no tensile stress is applied to the adhesive.

COMPARATIVE EXAMPLE 1

Procedures of Examples 4 and 5 are repeated in the same manner except that the vertical angle of the heating coil covering the fitted assembly is larger than 180°. Under heating conditions adopted in Examples 4 and 5, the fitted portion is not heated to a desirable temperature, and in order to elevate the temperature of the fitted portions of both the outer member and the inner member to 230° C., an input electric power about two times the electric power required in Example 4 or 5 is necessary. Accordingly, the temperature of the side wall portions is extraordinarily elevated, and a much longer time is necessary for completing the cooling operation.

What is claimed is:

1. A process for the preparation of metal vessels, which comprises lap-bonding both the circumferential end portions of upper and lower members, each consisting of a seamless formed metal cup, through a layer of a hot adhesive interposed therebetween, wherein a high frequency induction heating coil is arranged so that the coil covers a part, smaller than the semicircle, of the circumferential portion to be formed into a seam, said seam consists of said end portions engaged with each other through the hot adhesive layer, applying electricity to the heating coil to induce an eddy current passing in the same or opposite direction from each of the side walls of the upper and lower members through said end portions, and the circumferential portion, and the heating coil are rotated relative to each other, whereby the end portions of both the upper and lower members are preferentially heated and a seam is formed by heat bonding.

2. A process according to claim 1, wherein the high frequency induction heating coil comprises an upper loopy coil and a lower loopy coil, both the loopy coils are arranged so that the lower portion of the upper coil and the upper portion of the lower coil are overlapped and in the overlapped region, the direction of the electric current induced by the upper coil is the same as the direction of the electric current induced by the lower coil, and the high frequency induction heating coil is disposed so that the upper coil confronts the upper member, the lower coil confronts the lower member and the overlapped portion of both the coils confronts the circumferential portion to be formed into a seam and in this state, electricity is applied to the high frequency induction heating coil.

3. A process according to claim 1, wherein the high frequency induction heating coil comprises one loopy coil, the high frequency induction heating coil is arranged so that the upper portion of the coil confronts the upper member, the lower portion of the coil in which the direction of the electric current is oposite to the direction of the electric current in the upper portion of the coil confronts the lower member and the portion to be formed into a seam is located in the central portion of the coil, and in this state, electricity is applied to the high frequency induction heating coil.

4. A process according to any of claims 1 through 3, wherein the high frequency induction heating coil is arranged so that the clearance between the coil and the circumferential portion to be formed into a seam is within R/4 in which R stands for the outer diameter of the circumferential portion and the vertical angle $\theta$ of the circumferential portion covered with the coil is 30° to 150°.

5. A process according to claim 1, wherein the fitted assembly of the upper and lower member is rotated 5 to 25 times during the period of the point of the starting of heating to the point of the termination of heating.

* * * * *